(12) United States Patent
Merchant

(10) Patent No.: US 7,845,902 B2
(45) Date of Patent: Dec. 7, 2010

(54) JET ENGINE INLET-FAN SYSTEM AND DESIGN METHOD

(75) Inventor: Ali Merchant, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1415 days.

(21) Appl. No.: 11/057,958

(22) Filed: Feb. 15, 2005

(65) Prior Publication Data
US 2006/0179818 A1     Aug. 17, 2006

(51) Int. Cl.
*F01D 5/12*     (2006.01)
(52) U.S. Cl. .................................. 415/181; 415/914
(58) Field of Classification Search ................. 415/54, 415/181, 914
See application file for complete search history.

(56) References Cited
U.S. PATENT DOCUMENTS

| | | | | |
|---|---|---|---|---|
| 2,975,587 A | * | 3/1961 | Rae | 415/914 |
| 2,987,878 A | * | 6/1961 | Bogert | 138/46 |
| 3,054,255 A | * | 9/1962 | Stratford | 415/181 |
| 3,719,428 A | * | 3/1973 | Dettmering | 415/181 |
| 4,123,196 A | * | 10/1978 | Prince et al. | 415/181 |
| 4,678,398 A | * | 7/1987 | Dodge et al. | 415/181 |
| 7,147,426 B2 | * | 12/2006 | Leblanc et al. | 415/1 |

OTHER PUBLICATIONS

Ahsun, U. et al., "Design of a near-Isentropic Supersonic Inlet Using Active Control" Journal Propulsion and Power, 2005, pp. 292-299, vol. 21.
Wennerstrom, A. J., "Highly Loaded Axial Flow Compressors: History and Current Developments," Journal of Turbomachinery, 1990, pp. 567-568, vol. 112.

* cited by examiner

*Primary Examiner*—Christopher Verdier

(57) ABSTRACT

A supersonic aircraft engine axial fan that includes a rotating blade row having blades that receive a supersonic entry flow in the absolute frame and decelerate the flow to a lower supersonic or subsonic velocity exit flow while adding work to the flow to increase stagnation pressure. It is preferred that the lower velocity be subsonic. When the fan is combined with a suitably designed inlet, the propulsion system is compact and lighter in weight than conventional engines for supersonic aircraft.

5 Claims, 6 Drawing Sheets

JET ENGINE INLET-FAN SYSTEM AND DESIGN METHOD

BACKGROUND OF THE INVENTION

This invention relates to an engine for a supersonic aircraft and more particularly to an inlet and fan combination resulting in a significantly shorter, lighter and more efficient overall propulsion system for supersonic aircraft. A design method is also disclosed.

Air entering an engine of a supersonic aircraft must be slowed down from a supersonic speed to a subsonic speed in order for the engine to perform properly. A typical engine for use with a supersonic aircraft is shown in FIG. 1. A rather long inlet section 10 (typically exceeding the length of the engine itself) of a prior art engine 12 acts as an interface between external freestream air and the engine. The deceleration is achieved by varying the flow area and through a series of shock waves that develop in the inlet section 10. In this conventional inlet more than half the length (and weight) is typically required to decelerate the flow to subsonic conditions suitable for engine entry. For example, if the external freestream air velocity is Mach 2, the inlet section 10 will decelerate the velocity to approximately Mach 0.5 at the face of a fan 14. The largest contribution to the pressure loss also accumulates during this deceleration process in the inlet section 10.

In conventional turbofan engines such as the engine 12 of FIG. 1 the front fan 14 provides some fraction of the propulsive thrust and is driven by the core engine. The fan raises the total, or stagnation, pressure of the incoming air by adding work to the flow. A fraction of the air goes into the core engine and the remaining fraction (bypass air) is expelled through a nozzle for propulsive thrust. Conventional fans and engines are designed for a subsonic entry flow and subsonic exit flow.

Another known art engine for supersonic aircraft is the supersonic through-flow fan (STF) engine developed by NASA for the supersonic transport program. This engine is shown in FIG. 2. The fan 14 of this STF engine is based on an impulse blade design that adds work to the flow exclusively by turning the flow through a large angle in the relative frame of reference. There is a static pressure drop in the flow and the flow is accelerated to a higher velocity at the fan exit. The shock system in this fan includes weak oblique shocks and expansion fans, and the boundary layer remains well attached as there is a mild adverse pressure gradient on the blade surface. It is important to note that this STF fan design has absolute frame supersonic inlet and exit flow and in fact accelerates the flow to a higher Mach number resulting in performance penalties and implementation challenges. Although the length of the inlet 10 upstream of the fan 14 of the engine in FIG. 2 is reduced, this reduced length is merely traded for a much more complex problem of designing an efficient, light diffuser after the flow leaves the fan. (See, Schmidt, J. F., Moore, R. D., Wood, J. R. and Steinke, R. J., "Supersonic Through-Flow Fan Design" NASA TM-88908, 1987 and Tavares, T. S. "A Supersonic Fan Equipped Variable Cycle Engine for a Mach 2.7 Supersonic Transport," Masters Thesis, M.I.T., August 1985.)

SUMMARY OF THE INVENTION

In one aspect the inventive system and method disclosed herein include a supersonic aircraft engine axial fan having a rotating row of blades that receive an absolute frame supersonic entry flow and decelerate the flow to a lower velocity (supersonic or subsonic) exit flow while simultaneously adding work to increase stagnation pressure of the flow. In one embodiment the lower exit velocity is subsonic. In an alternative embodiment, the lower exit velocity is supersonic. The fan may further include a low total pressure loss inlet preceding the rotating blade row. In this embodiment, the inlet decelerates the flow to a Mach number in the range of 1.2-1.3 at fan entry through an inlet shape that creates a series of near-isentropic weak shock waves to decelerate the flow.

In a typical embodiment the blades of the rotating blade row are configured to produce a series of shock waves to decelerate the flow. In another embodiment, the fan further includes boundary layer suction as a means for boundary layer separation and shock position control on the blade surface and inner-outer annulus to enhance performance.

In another aspect, the invention is an integrated inlet/fan engine system for a supersonic aircraft. The system includes an inlet having a length selected to decelerate the flow from flight freestream supersonic velocity down to a velocity in the range of about Mach 1.2 to about Mach 1.3. A fan having a rotating blade row forming a fan face receives the decelerated absolute frame supersonic flow and decelerates the flow to a lower velocity exit flow while adding work to increase stagnation pressure of the flow.

The inventive inlet-fan system disclosed herein provides a shorter, lighter, and more efficient overall propulsion system for supersonic aircraft. The design disclosed herein provides for higher propulsion system efficiency that results in a reduction in fuel burn and longer aircraft range. The systems and methods described herein provide an engine with higher propulsion system mass flow having greater thrust for the same, or similar, size engine or smaller engines to meet a desirable or required aircraft thrust specification.

Weight and efficiency are competing propulsion system parameters having an impact on the overall goal of achieving environmentally-friendly supersonic flight over land and sustained long range cruise. The systems and methods disclosed herein reduce propulsion system length and weight, increase attendant payload, decrease fuel burn/consumption, and reduce sonic boom noise.

Bleed flow from the primary inlet flow stream is relied upon in conventional inlets to maintain stable operation and lower pressure losses. In contrast to these conventional inlets, the systems and methods described herein reduce or eliminate inlet bleed flows thereby increasing thrust and lowering drag and fuel burn.

DESCRIPTION OF THE PREFERRED EMBODIMENTS

Figure 1:
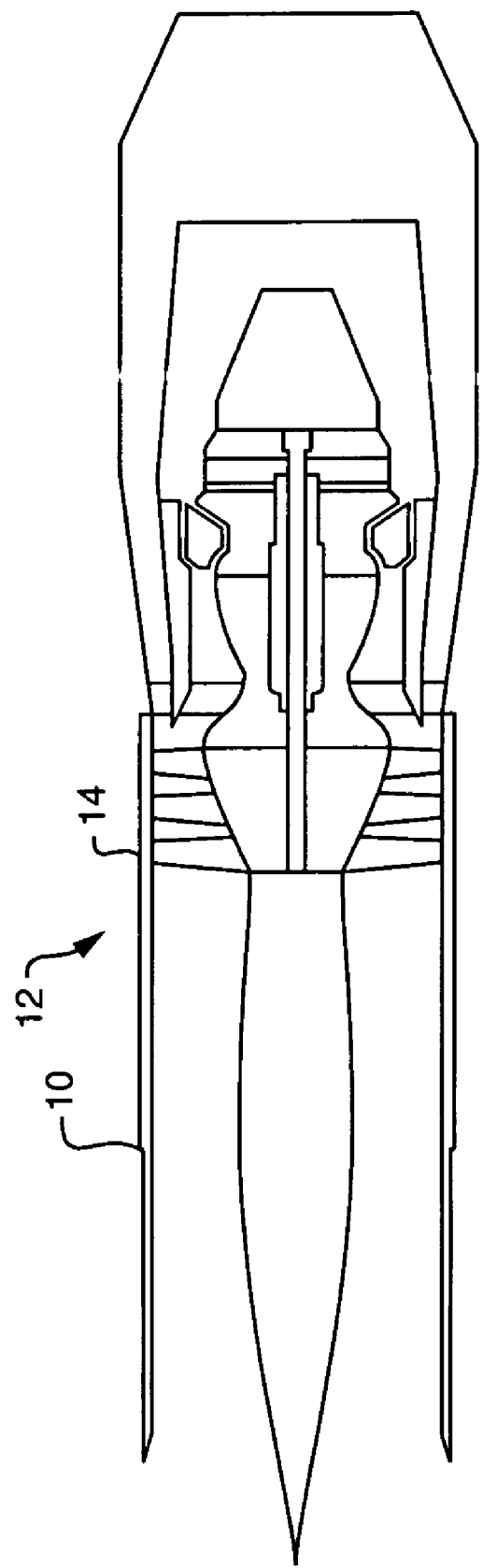
FIG. 1 is a cross-sectional view of a prior art conventional supersonic inlet and engine configuration.
Figure 2:
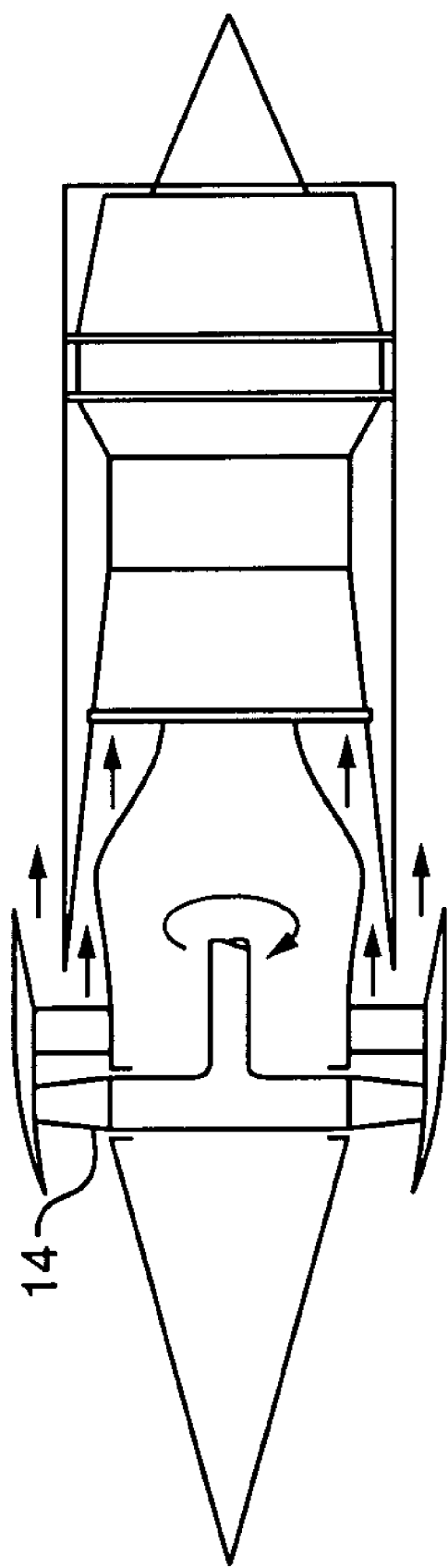
FIG. 2 is a prior art supersonic through-flow fan engine.
Figure 3:
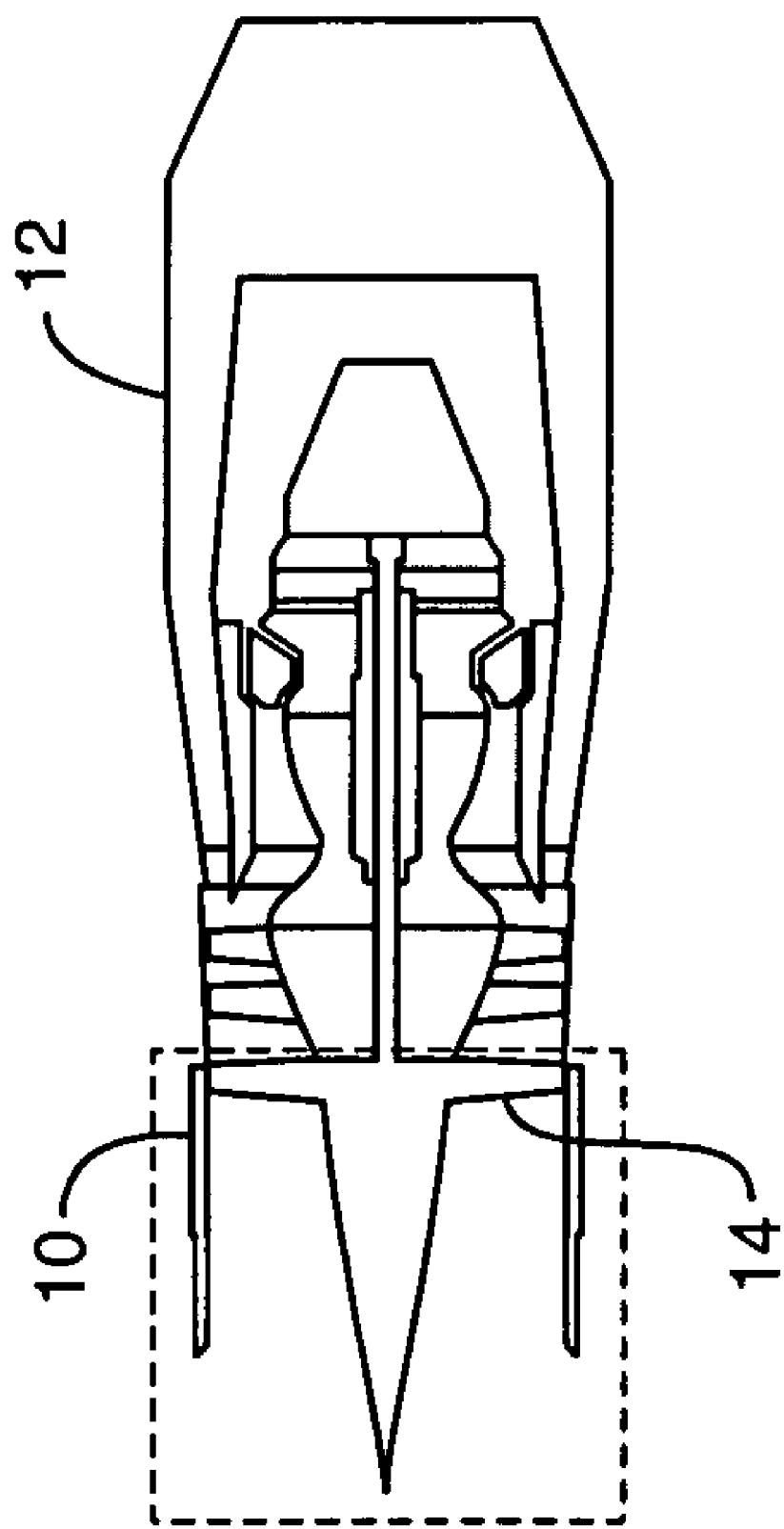
FIG. 3 is a cross-sectional view of an embodiment of the integrated inlet-fan supersonic propulsion system disclosed herein.

With reference now to FIG. 3 an engine 12 according to the invention includes a relatively short inlet (about half the length of a conventional supersonic inlet) section 10 and a fan 14 designed by the methods discussed below. The engine 12 is designed for use on supersonic aircraft having speeds typically on the order of Mach 2 or greater/lesser. Freestream air at Mach 2 or greater enters the inlet 10 and is decelerated to a Mach number ranging from approximately 1.2 -1.3 at the entry face of the fan 14. In this embodiment, the fan 14 decelerates the flow from the absolute frame supersonic velocity at its face to a subsonic velocity such as about Mach 0.5 at its exit. Not only does the fan 14 decelerate the flow from supersonic to subsonic conditions, the fan 14 also adds work to increase the stagnation pressure of the flow to a selected value. The subsonic flow leaves the fan 14 and enters the core engine as is well understood in the art.

The design procedure for an axial fan according to an embodiment of the invention with supersonic axial inflow and supersonic/subsonic axial outflow (SISO) and accompanying inlet will now be described. Typically, the fan performs a dual function of decelerating the incoming supersonic flow as well as raising the stagnation pressure of the flow by work addition. A relatively short supersonic inlet may be required to decelerate the flow from the flight Mach number to a Mach number ranging from about Mach 1.2 to about Mach 1.3 at the fan 14 entry face.

The general design procedure is described first followed by special consideration for the particular case of the SISO fan. Computational design tools available in industry today can be used to design the fan, and the general design methodology for conventional fans and compressors can be adapted with additional considerations primarily due to the high Mach numbers that occur in the SISO fan.

Figure 4:
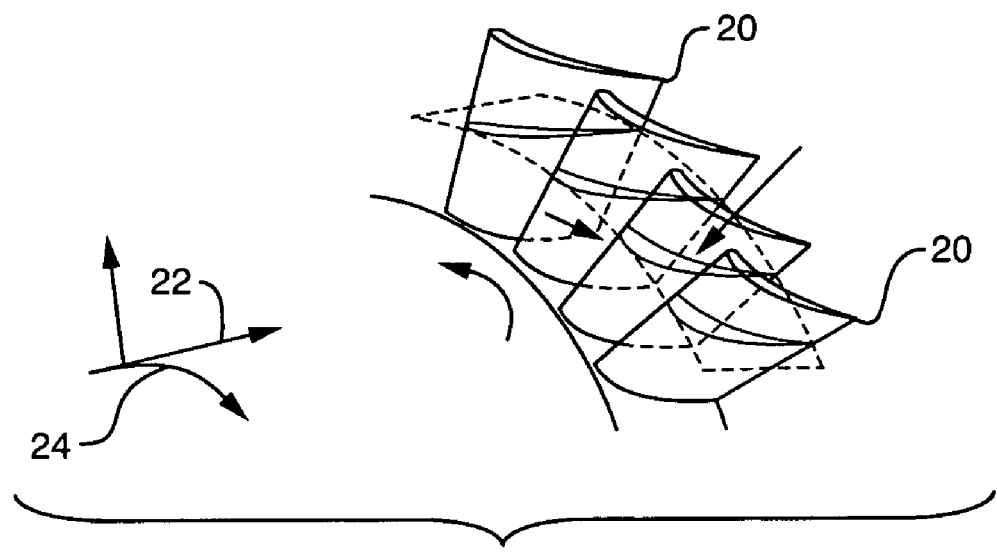
FIG. 4 is a schematic illustration, in perspective, of a general three-dimensional view of a fan/compressor blade for use in an embodiment of the invention.

According to an exemplary practice, the design of a fan includes the following: 1) designing the blade shape and 2) designing an inner and outer annulus which comprises the flowpath across the fan. FIG. 4 shows a three-dimensional view of a series of blades 20. The airflow is in an axial direction 22 and the rotation of the blades is in a tangential or circumferential direction 24.

Standard industry practice for the purpose of designing a fan or compressor is to decompose the flowfield through the fan into two steady-state approximations: 1) an axisymmetric average flow obtained by a circumferential average of the three-dimensional flowfield, and 2) streamsurfaces of this axisymmetric flow at varying radii from the hub of the fan to the tip. The streamsurfaces are unwrapped and mapped to a two-dimensional plane, and this planar blade-to-blade view is used to design or shape blade sections.

Figure 5A:
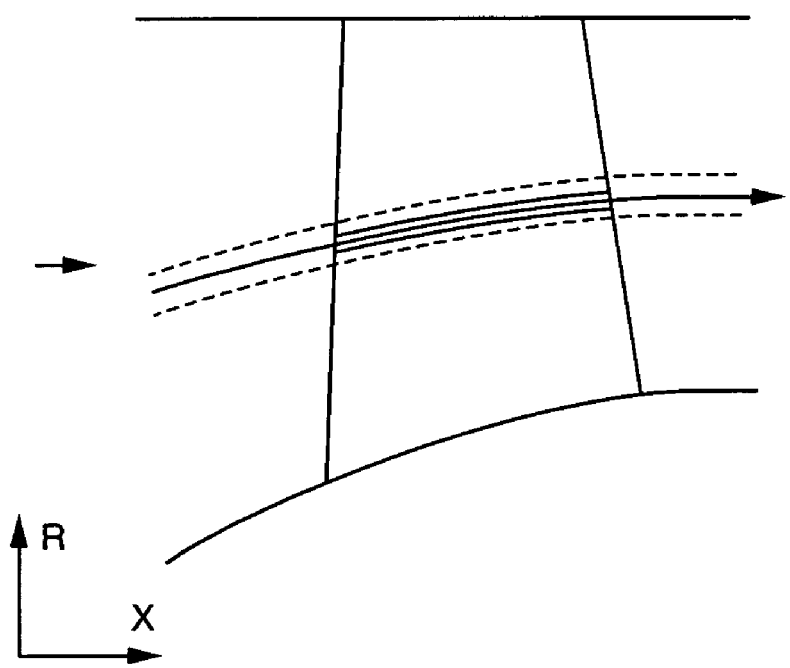
FIG. 5a is an axisymmetric view of a fan blade and flow path.
Figure 5B:
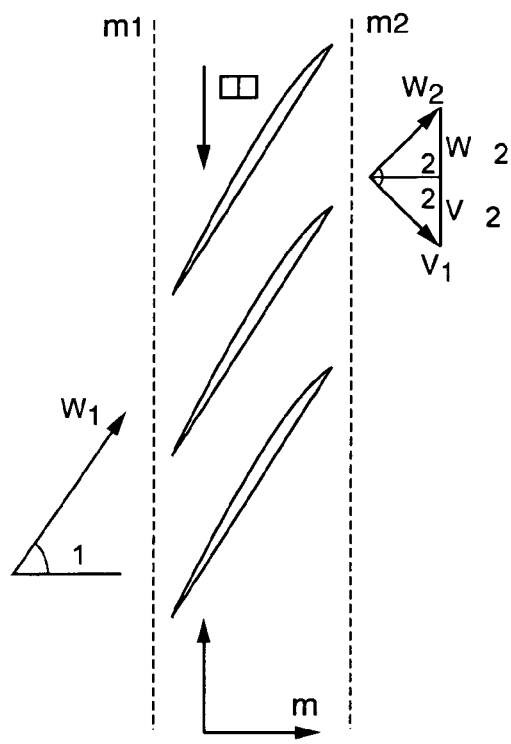
FIG. 5b is a blade section view on an unwrapped stream surface.

These two views are illustrated in FIGS. 5a and 5b respectively. The flow conditions upstream and downstream of the fan in the axisymmetric flow are used as boundary conditions for the blade section design. For the SISO fan, these include total pressure, total temperature, and zero swirl distribution (no upstream blade row) at the inlet, and exit static pressure at the exit.

A three-dimensional cylindrical coordinate system is used for the fan flowfield consisting of the axial (x), radial (r), and circumferential (θ) directions. An additional streamsurface coordinate (m) is used for the blade-to-blade flowfield, where $$m = \sqrt{x^2 + r^2}.$$

The typical nomenclature used for fan blades is also shown in FIGS. 5a and 5b. The absolute flow velocity and angles are V and α. The relative velocity and flow angles in the frame of reference of the rotor are W and β. The velocity and angle relations are given by:

$$V = \sqrt{V_x^2 + V_\theta^2}$$

$$V_\theta = V \sin(\alpha)$$

$$V_x = V \cos(\alpha)$$

$$W = \sqrt{W_x^2 + W_\theta^2}$$

$$W_\theta = W \sin(\beta)$$

$$W_x = W \cos(\beta)$$

$V_x$ is the axial velocity in the absolute frame of reference and $W_x$ is the axial velocity component in the relative frame of reference. Note that $V_x \equiv W_x$. The absolute ($V_\theta$) and relative swirl ($W_\theta$) velocity components are related through the blade rotational speed ($\Omega$).

$$V_\theta = W_\theta + \Omega R$$

The fundamental equation that relates the work of a fan to the flow velocity and direction change produced by the blades is the Euler's Turbine Equation.

$$\Delta C_P T_T = \Omega \Delta r V_\theta$$

Here, $C_P$ is the constant pressure specific heat of the flow. The total temperature ($T_T$) rise across the fan is determined by the rotational speed, the change in radius (r), and the change in the swirl ($V_\theta$) across the fan. To illustrate the relation of Euler's Turbine Equation to the blade shape and fan operation, it is applied to the mid-span streamline of the fan blade with some simple approximations. It is assumed that the flow is adiabatic and the radius change across the fan is negligible. The temperature ratio (τ) of the fan can then be expressed as $$\tau = 1 + \frac{U^2}{T_{T0}}(1 - \phi \tan(\beta))$$

in which U is the blade speed, φ is the flow coefficient given by the ratio of the exit axial velocity and the blade speed, T is the inlet total temperature, and β is the relative flow exit angle leaving the blade. The pressure ratio of the fan can be written as $$\pi = (1 + \eta(\tau - 1))^{\frac{\gamma}{\gamma - 1}}$$

in which η is the efficiency of the fan and γ is the specific heat ratio (1.4 for air). These two equations show how the fan blade exit angle determines the temperature, and when combined with the efficiency, which is a measure of the shock and viscous losses, determines the pressure ratio across the fan. Euler's Turbine Equation can be used on a per-streamsurface basis to determine the radial (spanwise) work distribution of the fan.

The above equations also show that the fan temperature and pressure ratio can be increased by some combination of increasing the blade speed U (Ωr), decreasing the axial velocity $V_x$, and increasing the blade turning angle β. A shock wave can be exploited as an efficient mechanism for decelerating the flow and raising the pressure over a very short distance in fan designs that have supersonic tip speeds. The fan design method discussed herein is an essential ingredient in shaping the blades to exploit the shock wave without incurring a large performance penalty. Typical conventional fans with supersonic tip speeds, but always with subsonic inlet axial velocity, have relative Mach numbers ranging from 0.7 at the hub to 1.5 at the tip. At lower span locations closer to the hub, the pressure rise occurs largely due to flow turning. Over the outer span of the fan closer to the tip, shock waves form due to the relative supersonic flow, and the temperature and pressure rise occur primarily due to the high tip speed, large velocity change across the shock system, and very little flow turning.

The SISO fan disclosed herein exploits the mechanism of deceleration through shock waves to raise the pressure of the incoming flow. However, unlike typical conventional fans, the combination of supersonic absolute flow, resulting from a supersonic axial velocity, and supersonic tip rotation speeds (U), results in inlet supersonic relative and absolute Mach numbers and attendant shock system over the entire span of the SISO fan.

Figure 6:
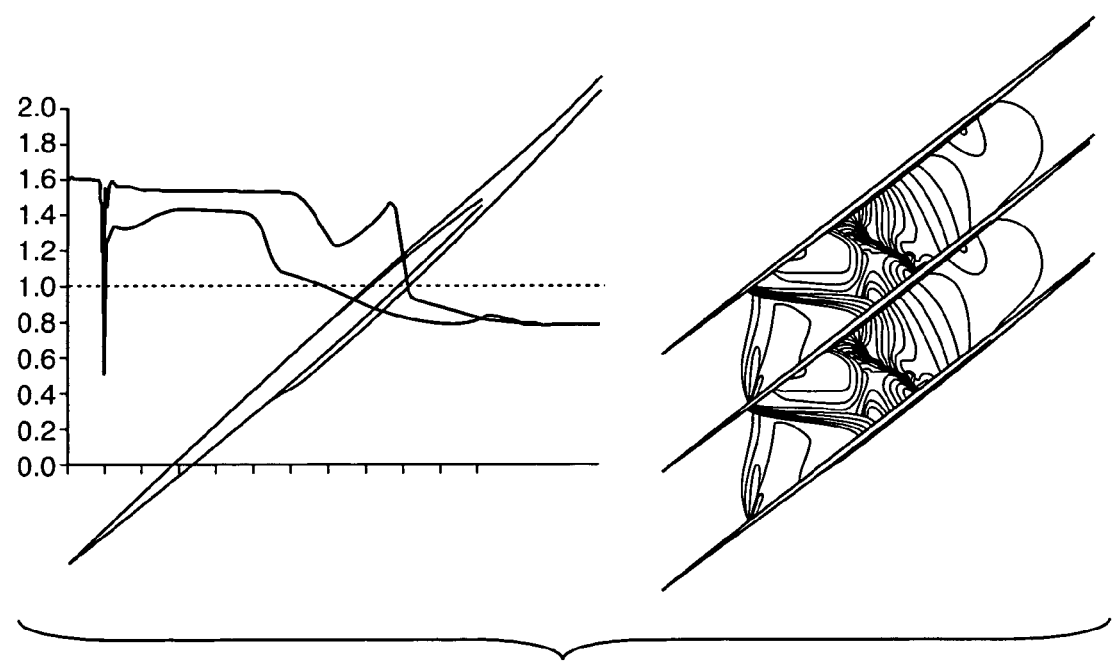
FIG. 6 is an exemplary mid-section flow field of a blade.

An example of a mid-section flowfield of the fan is shown in FIG. 6. The incoming flow at Mach=1.6 enters the blade and is decelerated through the bow shock, but remains supersonic. The flow is subsonic Mach=0.9 downstream of the terminal normal shock. There is virtually no relative flow turning due to the blade, and the pressure rise occurs, at least in part, if not entirely due to the deceleration of the flow.

There are three main computational tools that are required for designing the SISO fan. A two-dimensional axisymmetric flow solver is used to calculate the base flowfield through the fan. Typical inputs to the solver are the hub and casing contours, blade rotational speed, inlet mass flow, and desired radial work distribution, which is related to the stagnation temperature, and pressure ratio of the fan. In addition, empirical models of the shock wave and viscous losses may also be used as inputs. The axisymmetric flow calculation is post-processed to obtain the streamsurface positions and flow conditions upstream and downstream of the fan blade. These are used as inputs/boundary conditions for the blade shape design. A quasi-three-dimensional or blade-to-blade solver is used to calculate the flowfield due to the blade on the unwrapped streamsurface shown in FIG. 5b. This can provide the detailed information such as, without limitation, the blade surface pressure distribution and boundary layer development on the blade.

The pressure distribution around the blade can be used as a guide to shape the blade section to meet the design pressure ratio and other requirements. Inverse design methods can also be used to determine the blade shape for a prescribed pressure distribution (Youngren, H. H., Drela, M., "Viscous/Inviscid Method for Preliminary Design of Transonic Cascades," AIAA Paper 91-2364, 27th AIAA, SAE, ASME, and ASEE, Joint Propulsion Conference, Sacramento, Calif.; June 1991). The two-dimensional axisymmetric and quasi three-dimensional solvers are approximations to the three-dimensional flowfield and require empirical or simple analytical models to fill in or predict the missing flow mechanisms. A three-dimensional viscous flow solver can be used to calculate the detailed flow through the fan. This is important at least in part because successful SISO fan design depends on accurate prediction of the flowfield, which include at least, high Mach numbers, strong shock waves, and interaction of the shock waves and viscous boundary layers. The three-dimensional flowfield solution can be used for refining and validating the final design. These and other commercially available flow codes known in the gas turbine industry may be used by the systems and methods described herein.

Figure 7:
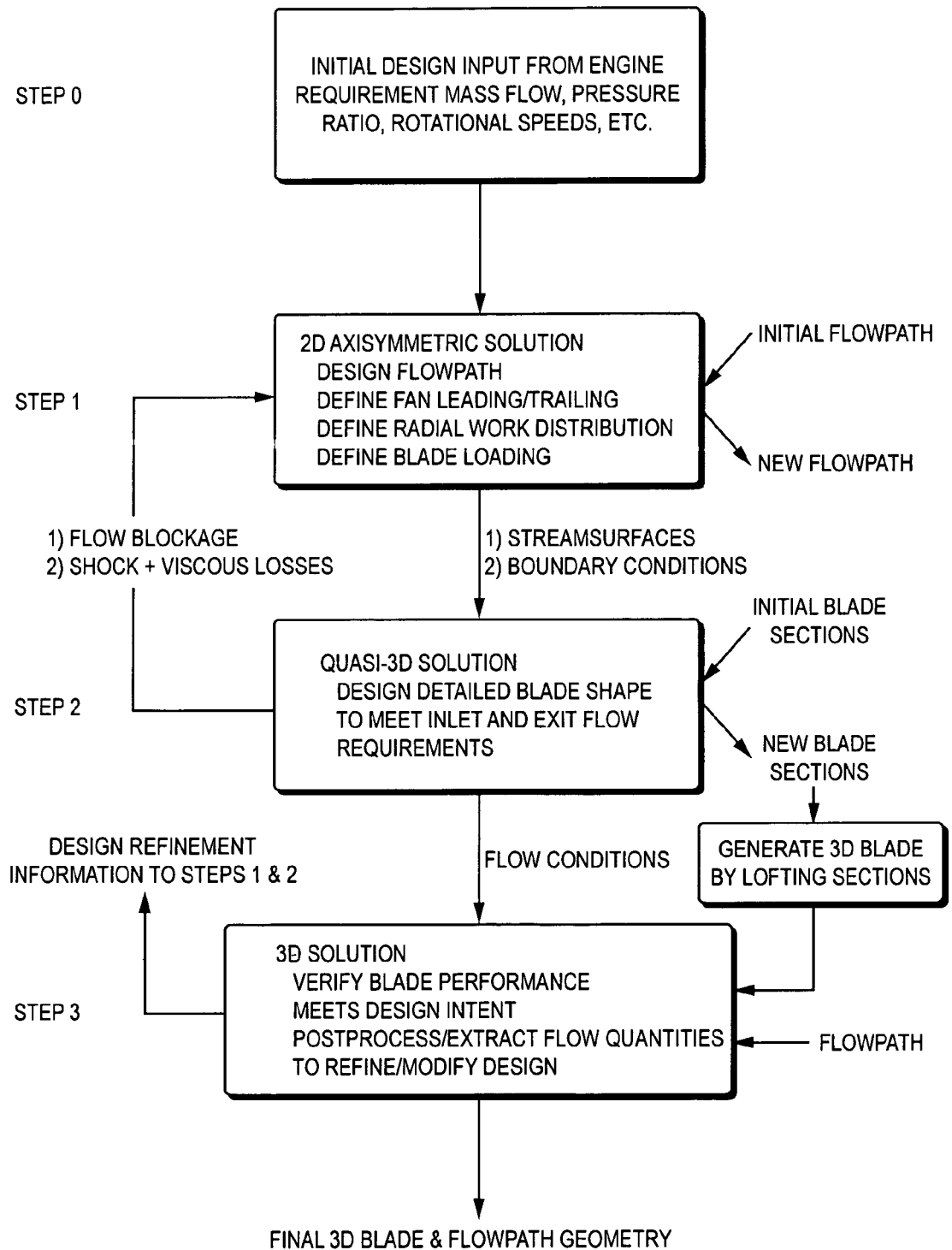
FIG. 7 is a flow diagram for a general design procedure for axial fan and compressor blade aerodynamic design.

A general procedure for designing axial fan and compressor blades is shown in FIG. 7. A preliminary engine design and thermodynamic cycle analysis can provide the initial inputs and constraints such as pressure ratio, blade rotational speed, and mass flow to begin the fan design process. Several iterations between the two-dimensional axisymmetric solver (step 1) and quasi-three-dimensional blade design solver (steps 2) may be employed to converge to a satisfactory design. As the design matures, three-dimensional calculations can also be included to account for three-dimensional flow phenomena ignored in steps 1 and 2 to further refine the fan design.

Typical ranges of design parameters expected for the SISO fan for a Mach 2 supersonic aircraft application are given in Table 1.

TABLE 1

Design parameter range for the SISO fan.

| Parameter | Design Range |
|---|---|
| Tip Speed | about 1300–1500 feet/sec |
| Pressure Ratio | about 1.4–1.8 |
| Efficiency Target | about 80–90% |
| Work Coefficient | about 0.3–0.4 |
| Diffusion Factor | about 0.3–0.5 |
| Inlet Axial Mach Number | about 1.2–1.3 |

The parameters fall in the range of current fans except the inlet supersonic axial Mach number. Conventional fans have an inlet axial Mach number ranging from about Mach 0.5 to about Mach 0.7. The fan tip speed is chosen to meet the pressure ratio requirement while obeying blade loading limits set by the work coefficient and diffusion factors. In the case of the SISO fan, the blade speed is also limited by the spanwise distribution of inlet relative Mach numbers. To achieve acceptable efficiency and operability, the peak recommended Mach number in the SISO fan at the tip should not exceed about 1.9.

Based at least in part on the preliminary design inputs discussed above being known, the design of the fan can be started by preparing initial data for the two-dimensional axisymmetric calculation in step 1. The initial flowpath contour can be determined using the one-dimensional conservation equations for mass, momentum, and energy. The hub-to-tip radius ratio for the flowpath at the inlet can range from about 0.4 to about 0.5. The exit hub-to-tip radius ratio typically depends on the design exit Mach number which can range from about 0.5 to about 0.6. The design radial work, or swirl distribution, for the fan can be calculated using Euler's Turbine Equation. The initial fan blade axial chord and blade count can be estimated from the loading requirements. It is also common to use simple empirical or analytical models for shock, viscous, tip clearance, and secondary flow losses.

Given the initial design inputs, the design iteration proceeds as follows. Further details can be found in Merchant, A., "Design and Analysis of Axial Aspirated Compressors", Ph.D. Thesis, MIT, June 1999 and A. J. Wennerstrom, above.

1) Calculate the axisymmetric flowfield. Examine at various streamsurfaces the inlet/exit Mach numbers, inlet/exit flow angles, blade loading parameters (diffusion factor and axial velocity ratio, and static pressure rise coefficient), and pressure ratio. Adjust the flowpath contour across the fan to achieve acceptable blade loading parameters. Adjust the radial work distribution to achieve a uniform spanwise pressure ratio. This will require higher work near the tip due to the larger losses contributed by higher Mach numbers and fan tip clearance flow. The fan axial chord and blade count may need to be modified to keep the diffusion factor within the acceptable range. Once an acceptable design is reached, about 5 to 7 streamsurfaces and flow boundary conditions at equal radial spacing can be generated for the blade section design in step 2.

2) Initial blade shapes can be generated based on the inlet and exit rotor relative flow angles and rotor relative Mach numbers from step 1. The initial blade shape can be generated from a camberline and thickness distribution. The camberline can be calculated from methods published in literature (Merchant, A., "Design and Analysis of Axial Aspirated Compressors", Ph.D. Thesis, MIT, June 1999; A. J. Wennerstrom, cited above; and Cumpsty, N. A., 1999, "Compressor Aerodynamics," $4^{th}$ Edition, Longman, UK). The thickness distribution can be chosen to meet the structural and other mechanical constraints for the fan.

3) The quasi-three-dimensional solutions are calculated for about 5 to 7 initial blade sections. The surface pressure distribution, pressure ratio, losses, and other quantities of interest are examined. The camberline is adjusted to meet the pressure ratio requirement. The blade may be reshaped if the overall pressure distribution is unacceptable due to an excessively strong shock system or boundary layer separation. An inverse design system may be used to prescribe a pressure distribution to improve the performance and produce the new blade shape (Merchant, above). The blade section solutions are postprocessed, and updated information about the losses, flow blockage, and blade geometry are fed back to step 1 to refine the axisymmetric solution.

4) Once satisfactory blade shapes are designed in steps 1 and 2, they can be lofted along a radial lofting axis passing through the area centroid of each section. A three-dimensional surface spline can be fit to the lofted sections to generate a three-dimensional blade shape.

5) The three-dimensional blade, flowpath contour, and final axisymmetric flow conditions can be used to launch a three-dimensional viscous flow calculation. If the fan performance predicted by the three-dimensional calculation is not satisfactory, the three-dimensional solution can be postprocessed for information that can be fed back to the two-dimensional axisymmetric solver in step 1. The blade section design can then be refined further using the new information (step 2).

During the aerodynamic iterations, several structural analyses can be performed to check the peak stresses and deflection of the fan blade. If these are excessive then the thickness distribution of the appropriate blade section can be modified. The thickness distribution may also need to be modified to meet additional aeromechanical constraints appropriate for the operating conditions.

A primary design challenge for the SISO fan is the supersonic Mach number that occurs over the entire span at the inlet resulting in a full span shock system. The following design issues are considered important, and must be adequately addressed in the design of the SISO fan.

1) Axial Mach number. A feasible range of inlet axial Mach numbers is from about 1.2 to about 1.3. This arises from a combination of rotational speeds used on typical fans and compressors combined with an important design consideration of maintaining inlet relative Mach numbers in the rotating blade row below 1.9. Excessively high Mach numbers can result in poor performance and operability due to strong shock waves and shock wave-boundary layer interaction losses.

2) Throat Margin. The throat margin is the ratio of flow area upstream of the blade and the minimum area in the blade passage calculated by approximating the flow through the blade as a quasi-1D compressible flow. The high supersonic Mach numbers for the SISO fan make the performance particularly sensitive to the area distribution within the blade passage. Insufficient throat margin will prevent the fan from achieving its design mass flow, pressure ratio, and required efficiency. A typical definition of throat margin can be found in Wadia, A. R. and Copenhaver, W. W., "An Investigation of the Effect of Cascade Area Ratios on Transonic Compressor Performance," ASME Journal of Turbomachinery, Vol. 118, pp 760-770, 1996.

3) Solidity and Blade Count. The solidity, which is the chord to blade spacing ratio, and the blade count must be chosen to blade loading limits set by the diffusion factor. However an excessively high solidity, particularly at the fan hub, may prevent the fan from achieving its design performance. In addition, the blade count must also be kept as low as possible, since the blockage of the flow area due to the presence of the blades and viscous boundary layers may also prevent the fan from achieving its design mass flow and performance. Excessive blockage will also prevent the desired axial inlet Mach numbers (about 1.2 to about 1.3) to be achieved.

4) Blade Shape Design. Design features and a methodology for designing high Mach number blades can be found in Merchant (1999 above). The blade shape is designed to exploit the shock wave in an efficient manner without excessive losses and boundary layer separation. The blade surface is shaped to prevent any excessive increase in the Mach number especially at the leading edge, and the Mach number upstream of the terminal normal shock does not exceed about 1.5 to prevent boundary layer separation. Three-dimensional sweeping and leaning the lofting or stacking axis of the blade can also be typically exploited to further improve the overall performance.

5) Boundary Layer Flow Control. Aspiration, or suction, on the fan blade surface can be used to control the shock position and boundary layer separation. The application of aspiration to transonic compressors has been studied computationally and validated through experiments (Merchant, A., Kerrebrock, J. L., Adamczyk, J. J., Braunscheidel, E., "Experimental Investigation of a High Pressure Ratio Aspirated Fan Stage," Paper No. GT2004-53679, Proceedings of ASME Turbo Expo, Vienna, Austria, June 2004). A small aspiration flow fraction on the order of 1% of the fan flow can significantly enhance the fan performance.

A supersonic inlet can be designed using a two-dimensional axisymmetric solver such as the one used above for the fan blade design. The method of characteristics can also be used (Anderson, John David, Modern compressible flow: with historical perspective/John D. Anderson, Jr., Boston: McGraw-Hill, 2003). However, it is important for any design method to include and accurately calculate the viscous boundary layer development along the inlet.

The important consideration in the design of supersonic inlets are the pressure recovery and the length required to decelerate the flow from the flight Mach number to the fan face Mach number. In conventional inlets, the pressure losses are due to the oblique shock system in the supersonic portion of the inlet, the terminal normal shock, and the viscous boundary layers. In the case of the SISO fan, the terminal normal shock, which has the largest pressure loss contribution, is eliminated since the fan face flow is supersonic. Elimination of the terminal shock also eliminates the about 3-8% flow control bleed usually required to stabilize the terminal shock and prevent boundary layer separation downstream of the terminal shock, both of which add a significant system level penalty to the propulsion. The large fraction of the inlet length required to decelerate the flow from the inlet throat to subsonic conditions is also eliminated.

For the SISO fan the inlet decelerates the flow from the flight Mach number to a fan face Mach number ranging from about 1.2 to about 1.3. The inlet can be designed to achieve a nearly isentropic deceleration of the flow at design conditions through very weak shock waves. Such a near-isentropic design is discussed in Ahsun et al (2003). The inlet length may be decreased by having stronger oblique shock waves in the initial portion of the inlet followed by weaker shock waves closer to the fan face. It is desirable to prevent strong shock waves from propagating into the SISO fan that may lead to deterioration in performance.

A small amount of flow control on the order of ±1% of the overall inlet mass flow may be required in the inlet to enhance the performance of the inlet and control the variations in the fan inlet Mach number due to atmospheric disturbances ("Design of an Actively Stabilized Near-Isentropic Inlet," U. Ashun, A. Merchant, J. Paduano, M. Drela, Paper No. 2003-4096, Proceedings of the $18^{th}$ AIAA Computational Fluid Dynamics Conference, Orlando, Fla., June 2003 (to appear in J. of Propulsion and Power)).

There are no special materials or processes required for manufacturing the SISO fan of the invention. Existing materials and manufacturing techniques could be used to manufacture the fan. However, stricter tolerance of the machining process may be required due to the inherent sensitivity of supersonic flow to small geometric variations as compared to conventional fan blades.

Those skilled in the art will appreciate that the integrated inlet-fan system disclosed herein can be readily interfaced with a conventional engine. This attribute has a major implication for its use in the near term on supersonic propulsion systems that consist of existing engines.

Weight and efficiency are key competing propulsion system parameters having an impact on the overall goal of achieving environmentally friendly supersonic flight over land and sustained for long-range cruise. Therefore, technologies such as the integrated inlet-fan system disclosed herein enable reduction in weight and improvement in efficiency of the propulsion system that can have a significant impact on the overall environmental footprint of the aircraft.

There is renewed interest in long-range supersonic flight with particular emphasis, in the near term, on business jet aircraft meeting environmental requirements for flight over land. The commercial viability of such aircraft depends on flight over land, low environmental impact, and high fuel efficiency for long range and low cost. The application of the integrated inlet-fan system disclosed herein (and the design method) to supersonic aircraft can improve fuel efficiency and decrease weight with attendant commercial benefits. An alternative application is in missiles which use turbofan and turbojet engines for which range and weight are important.

The contents of all of the references cited above are incorporated herein by reference in their entirety. The subject matter incorporated by reference is non-essential subject matter.

It is recognized that modifications and variations of the invention disclosed herein will be apparent to those of ordinary skill in the art and it is intended that all such modifications and variations be included within the scope of the appended claims.

What is claimed is:

1. An axial fan comprising:
a rotating blade row including blades that receive an absolute supersonic freestream entry flow in an absolute, non-rotating reference frame over some part or all of the span and decelerate the flow to a subsonic velocity exit flow while adding work to the flow to increase stagnation pressure.

2. The fan of claim 1 further including a low total pressure loss inlet preceding the rotating blade row.

3. The fan of claim 2 wherein the inlet decelerate the flow to a Mach number in the range of about 1.2—about 1.3 at fan entry.

4. The fan of claim 3 wherein the inlet creates a series of near-isentropic weak shock waves to decelerate the flow.

5. The fan of claim 1 wherein the blade configuration results in a series of shock waves to decelerate the flow.

* * * * *